United States Patent
Kuo et al.

(10) Patent No.: US 8,625,613 B2
(45) Date of Patent: Jan. 7, 2014

(54) CABLE MODEM AND PRIORITY SETTING METHOD THEREOF

(75) Inventors: Tien-Ting Kuo, Taipei Hsien (TW); Yew-Min Lo, Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 444 days.

(21) Appl. No.: 12/953,236

(22) Filed: Nov. 23, 2010

(65) Prior Publication Data

US 2012/0076130 A1    Mar. 29, 2012

(30) Foreign Application Priority Data

Sep. 27, 2010    (CN) .......................... 2010 1 0293804

(51) Int. Cl.
*H04L 12/66* (2006.01)
*H04L 29/06* (2006.01)
*H04L 29/08* (2006.01)

(52) U.S. Cl.
USPC .......................................... 370/401; 370/352

(58) Field of Classification Search
None
See application file for complete search history.

(56) References Cited

U.S. PATENT DOCUMENTS

| | | | | |
|---|---|---|---|---|
| 5,343,473 | A * | 8/1994 | Cidon et al. | 370/465 |
| 6,890,675 | B2 * | 5/2005 | Koschany | 429/439 |
| 7,460,476 | B1 * | 12/2008 | Morris et al. | 370/230.1 |
| 2003/0142664 | A1 * | 7/2003 | Gerszberg et al. | 370/354 |
| 2004/0073946 | A1 * | 4/2004 | Kobayashi | 725/132 |
| 2005/0025105 | A1 * | 2/2005 | Rue | 370/338 |
| 2005/0226156 | A1 * | 10/2005 | Keating et al. | 370/235 |
| 2006/0177020 | A1 * | 8/2006 | Huart et al. | 379/88.13 |
| 2007/0230361 | A1 * | 10/2007 | Choudhury | 370/250 |

* cited by examiner

*Primary Examiner* — Asad Nawaz
*Assistant Examiner* — Jason Harley
(74) *Attorney, Agent, or Firm* — Altis Law Group, Inc.

(57) ABSTRACT

A cable modem and a priority setting method thereof receive signaling packets from telephone interfaces and local area network (LAN) interfaces, and preset the signaling packets from telephone interfaces as VoIP packets with a first priority and the signaling packets from the LAN interfaces as LAN packets with a second priority. The cable modem and the priority setting method pick out RTP packets from the VoIP and LAN packets, and classify the RTP packets as VoIP RTP packets and LAN RTP packets. The cable modem and the priority setting method determine whether all of the IP phones are on-hook, and update the LAN RTP packets from the second priority to the first priority in response to all of the IP phones being on-hook. The cable modem and the priority setting method allocate bandwidths for the signaling packets corresponding to the first priority and the second priority.

8 Claims, 3 Drawing Sheets

CABLE MODEM AND PRIORITY SETTING METHOD THEREOF

BACKGROUND

1. Technical Field

Embodiments of the present disclosure relate to cable modems, and particularly to a cable modem and a priority setting method of the cable modem.

2. Description of Related Art

A cable modem generally sets various priorities for signaling packets when transmitting the signaling packets between customer premise equipments (CPEs) and Internet protocol (IP) phones to Internet, in order to meet particular efficiency requirements of the signaling packets. For example, real-time transport protocol (RTP) packets are set with high priority, and non real-time transport protocol (nRTP) packets are set with low priority. The priority setting method is important for the cable modem, since it has a great impact on bandwidth allocation.

However, the previous setting method is too simple to set priorities properly. For example, too much signaling packets are unnecessarily set with the high priority or improperly set with the low priority. Therefore, an unaddressed need exists in the cable modem to provide a priority setting method to improve network quality of service (QoS).

DETAILED DESCRIPTION

Figure 1:
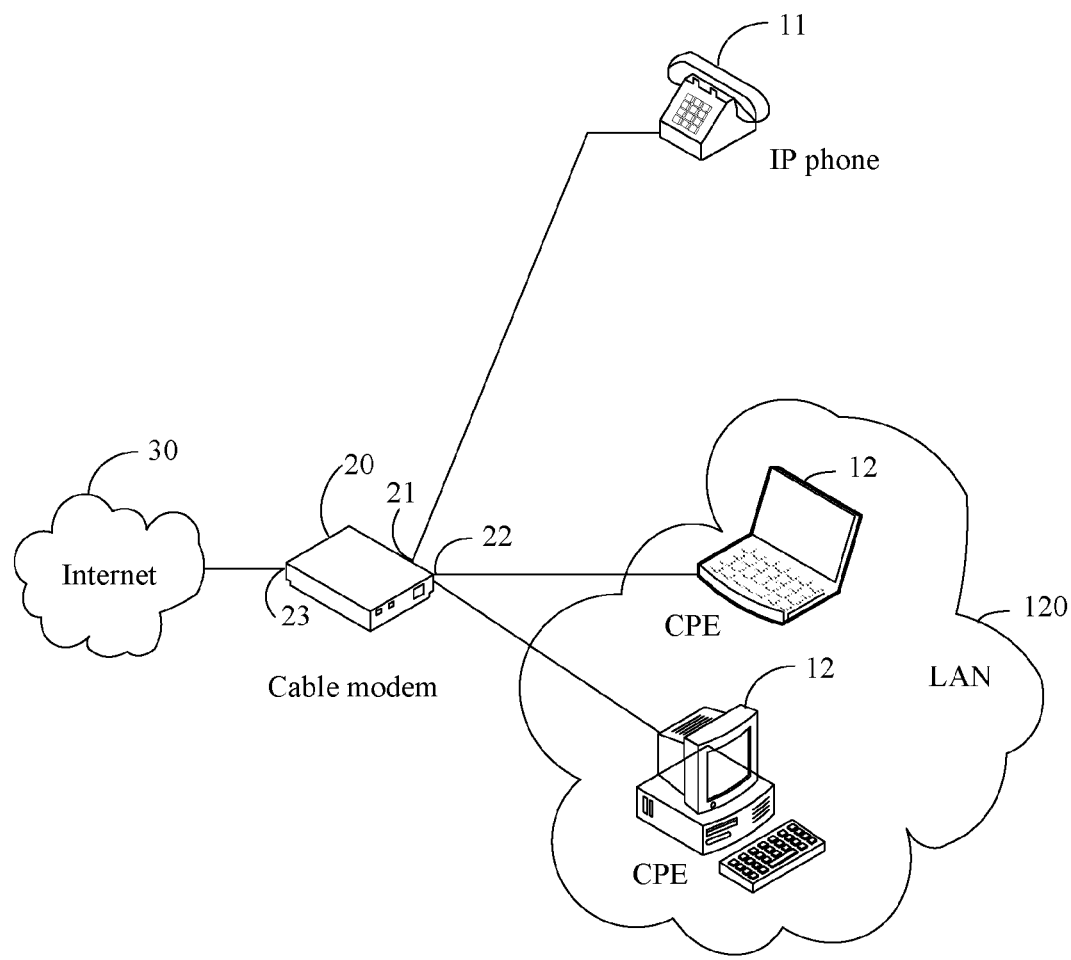
FIG. 1 is a schematic diagram of one exemplary embodiment of an environment of a cable modem of the present disclosure.

Referring to FIG. 1, a schematic diagram of one exemplary embodiment of an environment of a cable modem 20 is shown. In one embodiment, the cable modem 20 is an embedded multimedia terminal adapter (MTA) with telephone interfaces 21. The cable modem 20 comprises the telephone interfaces 21 to connect to Internet protocol (IP) phones 11, local area network (LAN) interfaces 22 to connect to CPEs 12 in a small office or home LAN 120, and a wide area network (WAN) interface 23 to connect to Internet 30.

The telephone interfaces 21 are also called multimedia terminal adapter (MTA) interfaces, or VoIP interfaces. In one embodiment, the telephone interfaces 21 may be RJ-11 interfaces. It should noted that the number of the telephone interfaces 21 are not restricted to one, and may be two or more.

The LAN interfaces 22 may be RJ-45 interfaces. It should noted that the number of the LAN interfaces 22 are not restricted to one, and may be four or more.

The WAN interface 23, also called a cable interface, connects to the Internet 30 by way of cable or hybrid of fiber and cable (HFC) networks.

Figure 2:
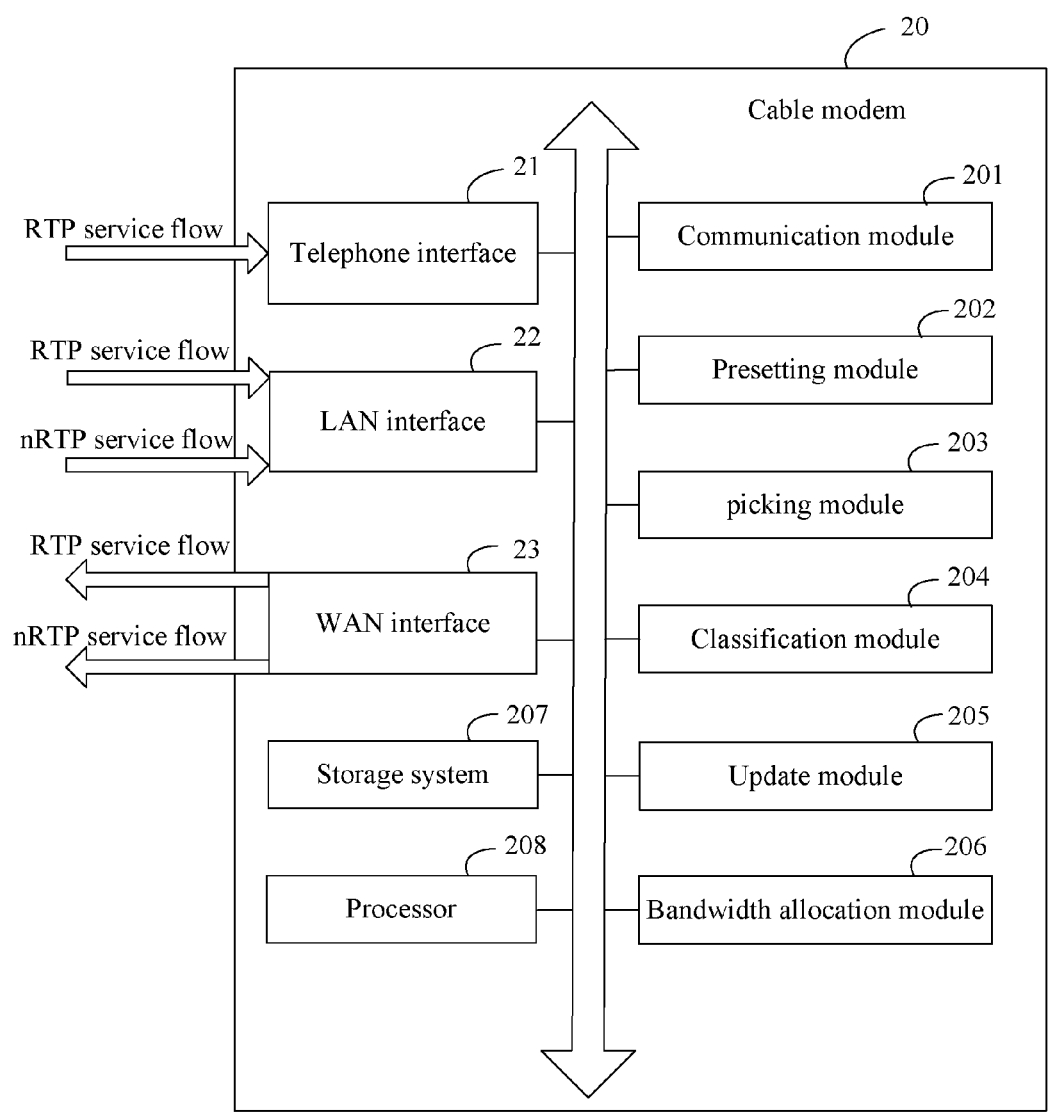
FIG. 2 is a block diagram of one exemplary embodiment of the cable modem of the present disclosure.

Referring to FIG. 2, a block diagram of one exemplary embodiment of the cable modem 20 is shown. The cable modem 20 bridges the IP phones 11 and the CPEs 12 in the LAN 120 to the Internet 30, as shown in FIG. 1, to transceive signaling packets therebetween. The cable modem 20 comprises the telephone interfaces 21, the LAN interfaces 22, the WAN interface 23, a storage system 207, at least one processor 208, and a plurality of functional modules 201-206.

The functional modules 201-206 may comprise computerized code in the form of one or more programs that are stored in the storage system 207. The computerized code includes instructions that are executed by the at least one processor 208 to provide functions for functional modules 201-206. In one embodiment, the storage system 207 may include hard disk drives, flash memories, random access memory (RAM), read-only memory (ROM), caches, or external storage mediums such as compact discs. In one embodiment, the functional modules 201-206 comprise a communication module 201, a presetting module 202, a picking module 203, a classification module 204, an update module 205, and a bandwidth allocation module 206.

The communication module 201 is operable to receive signaling packets from the telephone interfaces 21 and the LAN interfaces 22 synchronously. In one embodiment, the signaling packets comprise the RTP packets and the nRTP packets. The nRTP packets are received from the LAN interfaces 22 over nRTP service flows, and the RTP packets are received both from the telephone interfaces 21 and from the LAN interfaces 22 over RTP service flows. In one embodiment, the RTP packets comprise media gateway control protocol (MGCP) packets and session initiation protocol (SIP) packets.

Each of the signaling packets comprises a source port field, a source address, and receiving interface. The source port field records a source port of corresponding one of the signaling packets, such as 2427 port or 5060 port. In one embodiment, the 2427 port is a default port to transmit media gateway control protocol (MGCP) packets, the 5060 port is a default port to transmit session initiation protocol (SIP) packets, and the other ports besides these two are default port to transmit the nRTP packets. The source address records a source device of corresponding one of the signaling packets, such as the CPEs 12 or the IP phones 11. The receiving interface records which interface the signaling packets received from, such as telephone interfaces 21 or the LAN interfaces 22.

The presetting module 202 is operable to classify the signaling packets according to the receiving interfaces or the source addresses of the signaling packets, and preset priority based on the classification. In one embodiment, the presetting module 202 classifies those signaling packets received from the telephone interfaces 21 and/or the source addresses of the signaling packets being the IP phones 11 as VoIP packets, and presets the VoIP packets with a first priority. The presetting module 202 classifies those signaling packets received from the LAN interfaces 22 and/or the source addresses of the signaling packets are the CPEs 12 as LAN packets, and presets the LAN packets with a second priority. In one embodiment, the first priority is higher than the second priority.

The picking module 203 is operable to pick out RTP packets from the LAN packets and the VoIP packets according to the source port fields thereof. In one embodiment, if the source port field of one of the LAN and VoIP packets is 5060 port or 2427 port, the one packet is confirmed as an RTP packet, otherwise the one packet is a nRTP packet. In the embodiment, all the VoIP packets are RTP packets. Therefore, only one or more LAN packets would be determined as nRTP packets.

The classification module 204 is operable to classify the RTP packets as VoIP RTP packets and LAN RTP packets, according to the receiving interfaces or source addresses thereof. The presetting module 202 maintains the VoIP RTP packets as the first priority.

The update module 205 is operable to determine whether all of the IP phones 11 connected to the telephone interfaces 21 are on-hook. The update module 205 updates the LAN RTP packets from the second priority to the first priority in response to all of the IP phones 11 being on-hook. In one embodiment, if at least one IP phone 11 is not on-hook, the presetting module 202 maintains the LAN RTP packets as the second priority.

In one embodiment, the cable modem 20 sets priorities flexibly for the LAN RTP packets in accordance with working states of the IP phones 11, the source port field and the receiving interfaces of the signaling packets, such as the RTP packets, the nRTP packets, the telephone interfaces 21, or the LAN interfaces 22.

The bandwidth allocation module 206 allocates bandwidths for the signaling packets corresponding to the first priority and the second priority. In one embodiment, the bandwidth allocation module 206 allocates the bandwidths for the VoIP RTP packets corresponding to the first priority and the LAN nRTP packets corresponding to the second priority. The bandwidth allocation module 206 further allocates the LAN RTP packets corresponding to the second priority in response to at least one IP phone 11 being not on-hook, and the LAN RTP packets corresponding to the first priority in response to all of the IP phones 11 being on-hook.

The communication module 201 further transmits the signaling packets in the allocated bandwidths to the WAN interface 23, in accordance with the first and second priorities in sequence of time.

In one embodiment, the cable modem 20 sets priorities flexibly for the LAN RTP packets, therefore, MGCP or SIP packets received from the LAN interfaces 22 have the chance to use the first (high) priority bandwidths, and the first (high) priority bandwidths can be utilized efficiently.

Figure 3:
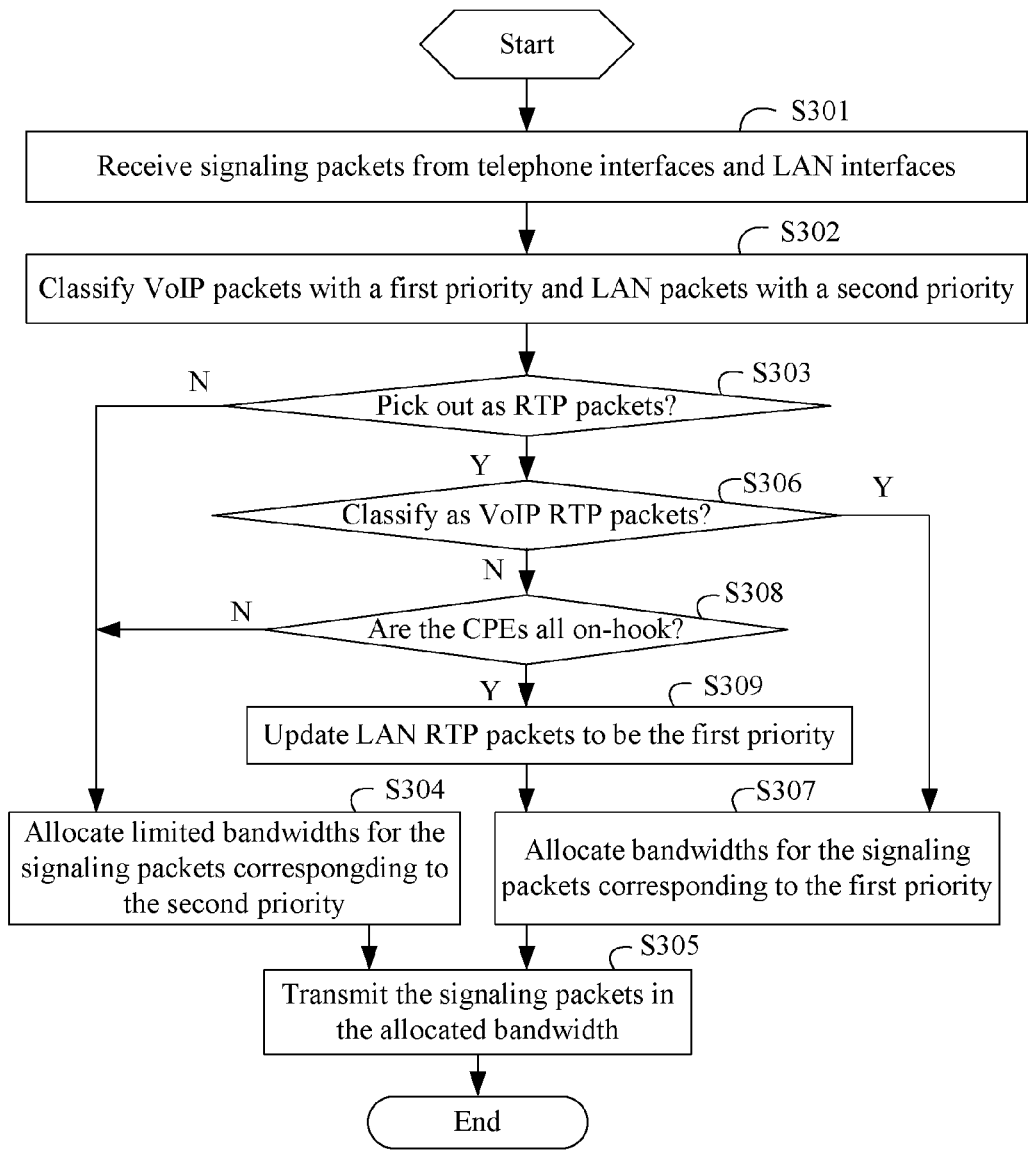
FIG. 3 is a flowchart of one exemplary embodiment of a priority setting method of the cable modem of the present disclosure.

Referring to FIG. 3, a flowchart of one exemplary embodiment of a priority setting method of the cable modem 20 is shown. The cable modem 20 bridges the IP phones 11 and the CPEs 12 in the LAN 120 to the Internet 30, as shown in FIG. 1, to transceive signaling packets therebetween. The priority setting method sets various priorities for the signaling packets from the IP phones 11 and the CPEs 12 and is executed by the cable modem 20 shown in FIG. 2.

In block S301, the communication module 201 receives the signaling packets from the telephone interfaces 21 and the LAN interfaces 22 synchronously. In one embodiment, the signaling packets comprise the RTP packets and the nRTP packets. The nRTP packets are received from the LAN interfaces 22 over nRTP service flows, and the RTP packets are received both from the telephone interfaces 21 and from the LAN interfaces 22 over RTP service flows. In one embodiment, the RTP packets comprise media gateway control protocol (MGCP) packets and session initiation protocol (SIP) packets.

Each of the signaling packets comprises a source port field, a source address, and receiving interface. The source port field records a source port of corresponding one of the signaling packets, such as 2427 port or 5060 port. In one embodiment, the 2427 port is a default port to transmit media gateway control protocol (MGCP) packets, the 5060 port is a default port to transmit session initiation protocol (SIP) packets, and the other ports besides these two are default port to transmit the nRTP packets. The source address records a source device of corresponding one of the signaling packets, such as the CPEs 12 or the IP phones 11. The receiving interface records which interface the signaling packets received from, such as telephone interfaces 21 or the LAN interfaces 22.

In block S302, the presetting module 202 classifies the signaling packets according to the receiving interfaces or the source addresses thereof, and presets priority based on the classification. In one embodiment, the presetting module 202 classifies those signaling packets received from the telephone interfaces 21 and/or the source addresses of the signaling packets being the IP phones 11 as VoIP packets, and presets the VoIP packets with a first priority. The presetting module 202 classifies those signaling packets received from the LAN interfaces 22 and/or the source addresses of the signaling packets are the CPEs 12 as LAN packets, and presets the LAN packets with a second priority. In one embodiment, the first priority is higher than the second priority.

In block S303, the picking module 203 picks out RTP packets from the LAN and VoIP packets according to the source port fields thereof. In one embodiment, if the source port field of one of the LAN and VoIP packets is 5060 port or 2427 port, the one packet is confirmed as a RTP packet, otherwise the one packet is a nRTP packet. In the embodiment, the VoIP packets are RTP packets. Therefore, only one or more LAN packets would be determined as nRTP packets.

If the picking module 203 determines one or more LAN packets are the nRTP packets, the presetting module 202 maintains the one or more LAN packets as the second priority, and the flow goes to block S304. Those RTP packets confirmed by the picking module 203 would be processed following block S306.

In block S304, the bandwidth allocation module 206 allocates limited bandwidths for the nRTP packets corresponding to the second priority.

In block S305, the communication module 201 further transmits the nRTP packets in the allocated bandwidths to the WAN interface 23, in according with the second priorities and in sequence of time.

In block S306, the classification module 204 classifies the RTP packets as VoIP RTP packets and LAN RTP packets, according to the receiving interfaces or source addresses thereof.

If the RTP packets are VoIP RTP packets, the presetting module 202 maintains the VoIP RTP packets as the first priority, and the flow goes to block S307.

In block S307, the bandwidth allocation module 206 allocates the bandwidths for the signaling packets in the first priority.

In block S308, the update module 205 determines whether all of the IP phones 11 connected to the telephone interfaces 21 are on-hook.

If at least one IP phone 11 is not on-hook, the presetting module 202 maintains the second priority for the VoIP RTP packets, and the flow goes to block S304 to allocate the bandwidths for the signaling packets in second priority.

If all of the IP phones 11 are on-hook, in block S309, the update module 205 updates the LAN RTP packets from the second priority to the first priority and the flow goes to block S307 to allocate the bandwidths for the signaling packets in the first priority.

In one embodiment, the priority setting method of the cable modem 20 sets priority flexibly for the LAN RTP packet, therefore, MGCP or SIP packets from the LAN interfaces 22 have the chances to use first (high) priority bandwidths, and the first (high) priority bandwidths can be utilized efficiently.

The description of the present disclosure has been presented for purposes of illustration and description, and is not intended to be exhaustive or limited to the disclosure in the form disclosed. Many modifications and variations will be apparent to those of ordinary skill in the art. Various embodiments were chosen and described in order to best explain the principles of the disclosure, the practical application, and to enable others of ordinary skill in the art to understand the disclosure for various embodiments with various modifications as are suited to the particular use contemplated.

What is claimed is:

1. A cable modem to set priority for signaling packets received from at least one Internet protocol (IP) phone and at least one customer premise equipment (CPE), the signaling packets comprising real-time transport protocol (RTP) packets and non real-time transport protocol (nRTP) packets, the cable modem comprising:
   telephone interfaces to connect to the at least one IP phone;
   local area network (LAN) interfaces to connect to the at least one CPE;
   a wide area network (WAN) interface to connect to the Internet;
   at least one processor;
   a storage system; and
   one or more programs that are stored in the storage system and are executed by the at least one processor to perform a method, the method comprising:
      receiving the signaling packets from the telephone interfaces and the LAN interfaces synchronously, wherein the signaling packets comprise the nRTP packets from the LAN interfaces over nRTP service flows, and the RTP packets from the telephone interfaces and the LAN interfaces over RTP service flows;
      presetting the signaling packets from the telephone interfaces as VoIP packets with a first priority and presetting the signaling packets from the LAN interfaces as LAN packets with a second priority, wherein the first priority is higher than the second priority;
      picking out RTP packets from the VoIP packets and the LAN packets;
      classifying the RTP packets as VoIP RTP packets and LAN RTP packets;
      determining whether all of the IP phones are on-hook, and updating the LAN RTP packets from the second priority to the first priority in response to all of the IP phones being on-hook;
      allocating bandwidths for the signaling packets according to the first priority and the second priority.

2. The cable modem as claimed in claim 1, wherein the presetting priority step classifies the signaling packets from the telephone interfaces and/or source addresses of the signaling packets being IP phones as the VoIP packets, and the signaling packets from the LAN interface and/or the source addresses being CPEs as the LAN packets.

3. The cable modem as claimed in claim 1, wherein the allocating bandwidths step further allocates the bandwidths for the VoIP RTP packets corresponding to the first priority, the LAN nRTP packets corresponding to the second priority, and the LAN RTP packets corresponding to the second priority in response to at least one IP phone being not on-hook.

4. The cable modem as claimed in claim 3, further comprising step of transmitting the signaling packets in the allocated bandwidth, in accordance with the first and second priorities in sequence of time.

5. A priority setting method of a cable modem, to set various priorities for signaling packets from Internet protocol (IP) phones and customer premise equipments (CPEs) to a local area network (LAN) to Internet, the signaling packets comprising real-time transport protocol (RTP) packets and non real-time transport protocol (nRTP) packets, the cable modem comprising telephone interfaces to connect to the IP phones, LAN interfaces to connect to the CPEs, a WAN interface to connect to the Internet, the priority setting method comprising:
   receiving the signaling packets from the telephone interfaces and the LAN interfaces, wherein the signaling packets comprise the nRTP packets from the LAN interfaces over RTP service flows, and the RTP packets from the telephone interfaces and the LAN interfaces over nRTP service flows;
   presetting the signaling packets from the telephone interfaces as VoIP packets with a first priority and presetting the signaling packets from the LAN interfaces as LAN packets with a second priority, wherein the first priority is higher than the second priority;
   picking out RTP packets from the VoIP packets and the LAN packets;
   classifying the RTP packets as VoIP RTP packets and LAN RTP packets;
   determining whether all of the IP phones are on-hook, and update the LAN RTP packets from the second priority to the first priority in response to all of the IP phones being on-hook; and allocating bandwidths for the signaling packets according to the first priority and the second priority.

6. The priority setting method as claimed in claim 5, wherein the presetting priority step classifies the signaling packets from the telephone interfaces and/or source addresses of the signaling packets being IP phones as the VoIP packets, and the signaling packets from the LAN interface and/or the source addresses being CPEs as the LAN packets.

7. The priority setting method as claimed in claim 6, wherein the allocating bandwidths step comprises:
   allocating the bandwidths for the VoIP RTP packets corresponding to the first priority;
   allocating the bandwidths for the nRTP packets corresponding to the second priority; and
   allocating the bandwidths for the LAN RTP packets corresponding to the second priority in response to at least one IP phone being not on-hook.

8. The priority setting method as claimed in claim 7, further comprising step of transmitting the signaling packets in the allocated bandwidth, in accordance with the first and second priorities in sequence of time.

* * * * *